United States Patent
Story

(10) Patent No.: US 11,734,872 B2
(45) Date of Patent: *Aug. 22, 2023

(54) GENERATING SCENES CONTAINING SHADOWS USING PIXEL NOISE REDUCTION TECHNIQUES

(71) Applicant: Nvidia Corporation, Santa Clara, CA (US)

(72) Inventor: Jon Story, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,853

(22) Filed: Jun. 21, 2022

(65) Prior Publication Data

US 2022/0319098 A1    Oct. 6, 2022

Related U.S. Application Data

(63) Continuation of application No. 17/196,588, filed on Mar. 9, 2021, now Pat. No. 11,367,244, which is a
(Continued)

(51) Int. Cl.
*G06T 15/06* (2011.01)
*G06T 15/00* (2011.01)
(Continued)

(52) U.S. Cl.
CPC .......... *G06T 15/06* (2013.01); *G06F 9/3877* (2013.01); *G06T 5/002* (2013.01); *G06T 15/005* (2013.01); *G06T 15/60* (2013.01)

(58) Field of Classification Search
None
See application file for complete search history.

(56) References Cited

U.S. PATENT DOCUMENTS

| | | |
|---|---|---|
| 5,808,620 A | 9/1998 | Doi et al. |
| 7,242,408 B1 * | 7/2007 | Dunn ................ G06T 15/04 345/428 |

(Continued)

OTHER PUBLICATIONS

Arvo, "Penumbra masks," The Visual Computer 22.4 (2006): 1-13 (Year: 2006).*

(Continued)

*Primary Examiner* — Anh-Tuan V Nguyen

(57) ABSTRACT

The disclosure presents a technique for utilizing ray tracing to produce high quality visual scenes with shadows while minimizing computing costs. The disclosed technique can lower the number of rays needed for shadow region rendering and still maintain a targeted visual quality for the scene. In one example, a method for denoising a ray traced scene is disclosed that includes: (1) applying a pixel mask to a data structure of data from the scene, wherein the applying uses the scene at full resolution and pixels at the edge of a depth boundary change are identified using the pixel mask, (2) generating a penumbra mask using the data structure, (3) adjusting HitT values in the packed data buffer utilizing the penumbra mask, and (4) denoising the scene by reducing scene noise in the data of the data structure with adjusted HitT values.

20 Claims, 10 Drawing Sheets

Related U.S. Application Data continuation of application No. 16/423,379, filed on May 28, 2019, now Pat. No. 10,943,387.

(60) Provisional application No. 62/725,209, filed on Aug. 30, 2018.

(51) Int. Cl.
*G06T 5/00* (2006.01)
*G06T 15/60* (2006.01)
*G06F 9/38* (2018.01)

(56) References Cited

U.S. PATENT DOCUMENTS

| | | |
|---|---|---|
| 7,508,390 B1 | 3/2009 | Demers |
| 7,817,823 B1 | 10/2010 | O'Donnell |
| 8,223,148 B1 | 7/2012 | Carr et al. |
| 8,879,841 B2 | 11/2014 | Cohen et al. |
| 9,761,001 B2 | 9/2017 | Andersson et al. |
| 2002/0190995 A1 | 12/2002 | Lim |
| 2003/0112237 A1 | 6/2003 | Corbetta |
| 2004/0160441 A1 | 8/2004 | Lokovic et al. |
| 2004/0239673 A1 | 12/2004 | Schmidt |
| 2008/0175507 A1 | 7/2008 | Lookingbill et al. |
| 2009/0033673 A1 | 2/2009 | Siegel et al. |
| 2009/0034874 A1 | 2/2009 | Miller |
| 2010/0013963 A1 | 1/2010 | Jannard et al. |
| 2012/0306904 A1 | 12/2012 | Francois et al. |
| 2014/0240477 A1 | 8/2014 | Feng et al. |
| 2014/0375640 A1 | 12/2014 | Bakaiash |
| 2015/0254889 A1 | 9/2015 | Bakaiash |
| 2015/0262409 A1 | 9/2015 | Morgan et al. |
| 2015/0371435 A1 | 12/2015 | Zhu et al. |
| 2016/0248991 A1 | 8/2016 | Matsumoto |
| 2016/0260245 A1 | 9/2016 | DeCell et al. |
| 2017/0032500 A1 | 2/2017 | Csefalvay |
| 2017/0323471 A1* | 11/2017 | Chien ............... G06T 15/60 |
| 2019/0012826 A1* | 1/2019 | Melkote Krishnaprasad ............... G06T 7/50 |

OTHER PUBLICATIONS

Guennebaud, et al.; "High-Quality Adaptive Soft Shadow Mapping"; Computer Graphics Form; vol. 26, No. 3; 2007; 9 pgs.

Geusebroek, et al.; "Fast Anisotropic Gauss Filtering"; IEEE Transactions on Image Processing, vol. 12, No. 8; Aug. 2003; 6 pgs.

Wyman, et al.; "Penumbra Maps: Approximate Soft Whadows in Real-Time"; Eurographics Symposium on Rendering; 2003; 7 pgs.

\* cited by examiner

GENERATING SCENES CONTAINING SHADOWS USING PIXEL NOISE REDUCTION TECHNIQUES

CROSS-REFERENCE TO RELATED APPLICATION

This application claims the benefit of U.S. application Ser. No. 17/196,588, filed by Jon Story on Mar. 9, 2021, which claims benefit to U.S. application Ser. No. 16/423,379, filed by Jon Story on May 28, 2019, which claims benefit to U.S. Provisional Application Ser. No. 62/725,209, filed by Jon Story on Aug. 30, 2018, entitled "DENOISED RAY-TRACED SHADOWS," all which are commonly assigned with this application and incorporated herein by reference in their entirety.

TECHNICAL FIELD

This application is directed, in general, to rendering an image and, more specifically, to rendering an image using a denoising process for ray-traced shadows.

BACKGROUND

When rendering a scene from a computer program or application, different rendering techniques, including ray tracing, can be used. In ray tracing, rays are used to represent the interaction of light between surface points of objects in a scene and light sources of the scene. As the number of rays traced between the view perspective of a user, the objects, and light sources increase, a scene of high visual quality can be achieved. The amount of computing processing time required to complete the computations, however, also increases with an increase in the number of rays. In complex lighted scenes, the needed number of rays can cause the rendering process to fall below a frames-per-second threshold or target value. As the frames per second decreases, a user may be able to perceive the slow rendering, thereby reducing the overall user experience.

SUMMARY

In one aspect, a method for denoising a ray traced scene is disclosed. In one example, the method includes: (1) applying a pixel mask to a data structure of data from the scene, wherein the applying uses the scene at full resolution and pixels at the edge of a depth boundary change are identified using the pixel mask, (2) generating a penumbra mask using the data structure, (3) adjusting HitT values in the packed data buffer utilizing the penumbra mask, and (4) denoising the scene by reducing scene noise in the data of the data structure with adjusted HitT values.

In another aspect, the disclosure provides a system for denoising a ray traced scene. In one example the system for denoising includes: (1) an interface operable to receive scene data of a scene, and (2) a shadow scene processor operable to: (2A) apply a pixel mask to a data structure of the scene data using the scene at full resolution, wherein pixels at the edge of a depth boundary change are identified using the pixel mask, (2B) generate a penumbra mask using the packed data buffer, (2C) adjust HitT values in the packed data buffer utilizing the penumbra mask, and (2D) denoise the scene by reducing scene noise in the data of the data structure with adjusted HitT values.

In yet another aspect, the disclosure provides a rendering system. In one example, the rendering system includes (1) a renderer operable to generate a frame of a scene utilizing ray tracing and a final shadow mask, and (2) a shadow scene processor operable to apply a pixel mask to scene data from the scene, generate a penumbra mask using the scene data, adjust HitT values associated with the scene data utilizing the penumbra mask, denoise the scene by reducing scene noise in the scene data with adjusted HitT values, and generate the final shadow mask utilizing the scene data with reduced scene noise and the pixel mask, wherein pixels at the edge of a depth boundary change are identified using the pixel mask.

BRIEF DESCRIPTION

Reference is now made to the following descriptions taken in conjunction with the accompanying drawings, in which.

DETAILED DESCRIPTION

Figure 1:
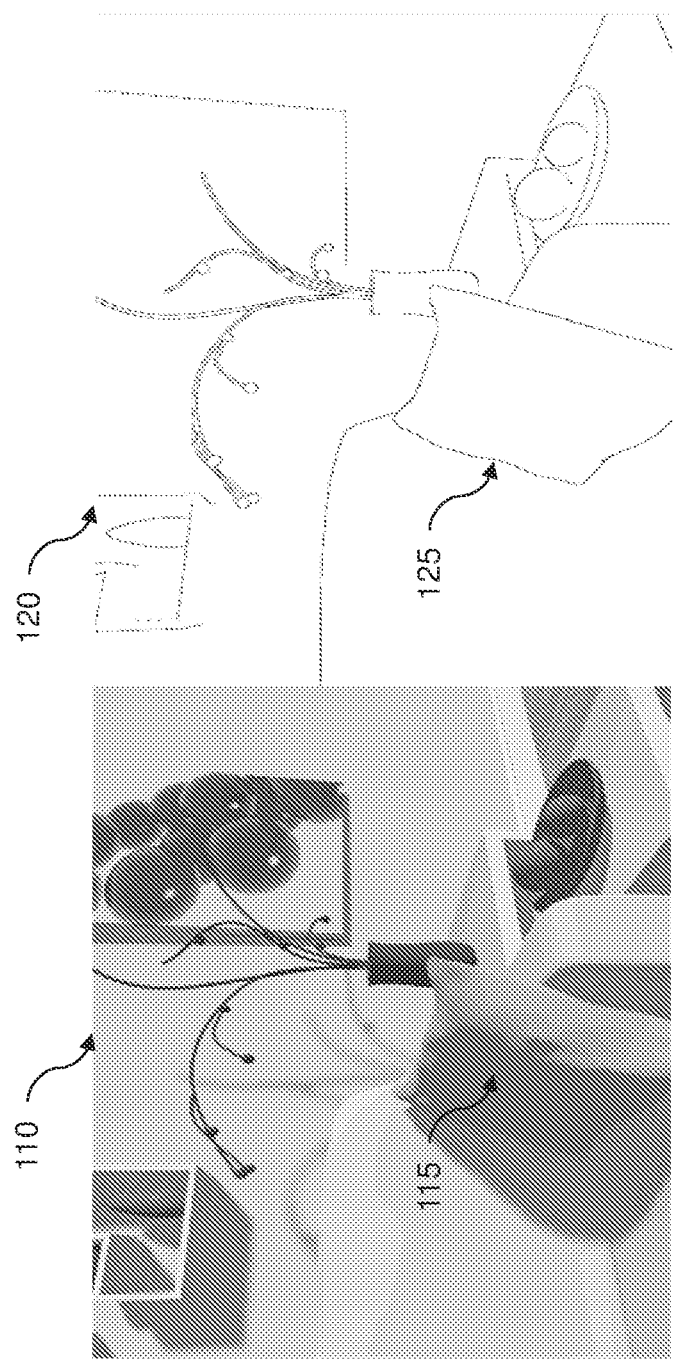
FIG. 1 is an illustration of an image of an example of a complex pixel mask employed in a denoising process carried out according to the principles of the disclosure.

An application, such as a computer program, can request that a scene from the application be generated for display. A game application, for example, can cooperate with a renderer to provide a scene from the game that includes a path with trees. A renderer generates an image or scene from a scene file that represents a two or three dimensional model. A renderer can be implemented as a processor or computing device that can receive instructions on what and how to generate the scene and then output the scene so it can be displayed or saved for later. The displayed scene can be continually updated from the perspective of a user within the scene. The game application can send information about the scene to the renderer multiple times per second to generate the scene for display and provide the user with a video-like visual experience of walking down the path.

As the user walks down the path, lighting of the scene can change as additional light sources, such as torches along the path, are included in the scene. Shadows from the torches can become part of the scene as the user walks along the path and light from the torches interacts with trees, rocks, or other objects in the scene. The scene can also include the sun that casts additional shadows on the path from branches and leaves of the trees in the scene. These shadows can overlay with other shadows in the scene caused by the light from the torches. With the multiple light sources, objects, and shadows, providing the proper lighting for the displayed scene becomes quite complex.

Ray tracing can be used for rendering this scene that includes the complex lighting and shadows from the various light sources and objects. Ray tracing can be described as extending a line, i.e., ray, from the user's view perspective to an object within the scene, and then determining a second ray from that object to a light source. These rays can then be used to determine the amount of light hitting the object, at what angle the light is to the user view perspective, shadows, and how the color, texture, and other object characteristics are represented to the user.

Typically, a shadow has two parts known as an umbra and a penumbra. The umbra is the main part of the shadow and is typically represented by a darkened shade area. The penumbra is a partially shaded outline of the shadow and blends the lighted portion of the scene with the umbra, or shadow portion. Outside of the shadow region, the light source, such as the sun, can light the surface of an object. The penumbra of the shadow is a narrow region that is partially darkened between the non-shadowed region and the full shadowed region. The shadow region itself can also have variations of shading depending on how the various light sources are cast and how the resultant light rays bounce off various objects within the scene, e.g., multiple shadows overlaid each other or multiple light sources shining. The set of pixels that are in the shadow penumbra form the penumbra region.

The rendering of the scene that includes complex shadowing effects can lead to difficulty in accurately representing the shadow effects amongst the many objects and light sources contained in the scene. Typically a maximum of 16 light sources are used in rendering a scene, though other values can be used. Employing conventional techniques, such as rasterization and light baking, to render complex shadows may result in an increase in visual artifacts, such as bleeding, lack of sharpness of the edges of objects, visual noise, blurriness, peter panning (shadows can appear disconnected from the object), and shadow acne (shadows become dotted). The presence of visual distortion reduces the visual quality of the scene.

Ray tracing can be used as an alternative or supplement to other rendering techniques to generate a higher visual quality of shadow and shadow effects in a scene. The more rays that are generated and rendered can lead to a sharper penumbra region for shadows. However, as the number of rays generated increases, the computing processing time needed to compute the rays increases as well. For example, using three rays per pixel (RPP) can be computed relatively quickly and can also result in a very noisy penumbra region, e.g., a user perceivable blurry edge between the lighted area and the shadow area. Using 196 RPP, which can approach the approximate ground truth of the shadowed scene, can result in a significantly improved visual appearance as compared to the three RPP. The cost of increasing the RPP to 196 can be expressed in computing processing time that is greater than the computing time when using three RPP.

A scene rendering system will have a targeted minimum frame rate for rendering the scene, for example, 30 frames per second (FPS), 60 FPS, or 120 FPS. FPS is the number of times the scene on the display or monitor is updated every second. A slower FPS can cause user perceivable flicker and other visual quality problems. As the computing processing time for rendering a shadow region increases, the potential impact on the overall rendering process can reduce the FPS and negatively impact the user's experience. Lowering the number of rays generated to maintain a targeted minimum number of FPS, however, can reduce the visual quality and also negatively impact the user's experience.

This disclosure presents using an improved denoising algorithm to reduce the visual artifacts caused by existing ray tracing rendering techniques, and also reduce the impact to the FPS rendering of the overall scene. Denoising is the reduction of noise, i.e., incorrect or seemingly random data values, that may not blend or flow with the remaining portions of the scene. The denoising disclosed herein can be used to reduce the visual artifacts by correcting or improving the rendering of shadow or shaded portions of a scene. Various aspects of the processes of this disclosure can be referred to as denoised ray traced shadows (DRTS) and can be used as part of an overall rendering process.

The overall rendering process can be executed in various ways. An application can call an application programming interface (API), a dynamic link library (DLL), or other type of function call to execute the rendering process. The rendering process can then execute the DRTS processes described herein. The API or DLL can be included, referenced, or instantiated by the calling application or another computing process to be an executable process. In an alternative, the application can call the DRTS processes directly. The DRTS processes can be included in the same or separate API, DLL, or other process from the other functions of the rendering process. The DRTS processes can be executed on general hardware, such a central processing unit (CPU), or specialized hardware, such as a graphics processing unit (GPU). In some aspects, the DRTS processes can be included within a video driver of the GPU.

The result from the DRTS processes can be a portion of the scene that can be used to further the rendering of the full scene. The portion of the scene can be a final shadow mask. The final shadow mask can be returned to the calling application or to the rendering process. The final shadow mask can be further utilized to improve the visual quality of a final rendered scene.

There can be six processes for this technique: (1) preparing the scene, (2) computing a complex pixel mask, (3) generating a penumbra mask, (4) smoothing occlusion hit distance (HitT), (5) denoising visibility data, and (6) resolving complex pixels. Complex pixels are identified as those pixels at the edge of a depth boundary change. An analysis of the light sources can aid in performance improvements of the DRTS processes. For example, each of the described processes can be executed for each light source within the scene. If a light source illuminates a portion of a scene, such as a candle off to one side, then the lighted portion of the scene can be processed through this algorithm, while the unilluminated portion can be skipped. This can be achieved with viewports placed around the area to be denoised.

Preparing the scene is a process that can receive data through an input buffer. The input buffer can include a visibility buffer, a HitT buffer, and a depth buffer. These buffers can contain data in various conventional storage formats, such as FP16, FP32, FP64, D24X8, and other formats and combinations. The output buffer from the process of preparing the scene is a packed data structure. The packed data structure can be, for example, an array of structures, such as an array of visibility, HitT, and the complex pixel mask. The packed data structure can be stored in a packed data buffer, for example, using a multi-channel texture, such as a four-channel format consisting of red, green, blue, and alpha channels using a floating point 16 (RGBAFP16) format. The packed data buffer can be packed into a four-channel texture since this can reduce the texture fetches that the process has to execute per iteration and in effect converts the scene data from a "structure of arrays" to an "array of structures" type of access pattern.

The scene data can specify objects in the scene that are within the view perspective of a user. An application can produce scene data for displaying a scene of the application scene. The application can send the scene data to a rendering process to transform the scene data into a format that can be displayed. Rendering is the general method for transforming scene data from an executing application into a visual scene that can be displayed on a monitor, printer, or stored.

In some examples, noted operations of preparing the scene process include packing the visibility buffer data and the HitT buffer data into two channels of the output buffer, and computing a complex pixel mask. In some aspects, the complex pixel mask can be stored in one channel of the output buffer. In some aspects, the visibility buffer data and the HitT buffer data can be down-sampled. The HitT buffer data can include the distance a ray traveled before it hits some geometry or, alternatively, the distance between a receiving pixel and occluding geometry in ray-traced shadows.

The complex pixel mask can be used by the denoise process to avoid the creation and propagation of visual artifacts, such as bleeding, and can be used by the resolving complex pixels process where complex pixels are resolved and up-sampled. The complex pixel mask can be calculated using a determined pixel grid pattern, such as a pixel grid of size five by five (5×5). Other pixel grid sizes can be utilized, such as 3×3 or 7×7. The grid size selected can be determined utilizing scene factors and the rendering process parameters. Smaller grids may not be large enough to find the depth boundary pixels, e.g., an object edge. Larger grid sizes, due to an increase in computational time, may provide diminishing returns on the computational processing time used. The center of the pixel grid is positioned on the center pixel, which is identified as the pixel of interest being analyzed. Depth boundary detection can be performed on the surrounding pixels, in the pixel grid, of the pixel of interest. If any of the surrounding pixels, e.g., test pixels, result in a depth boundary change, e.g., depth boundary being crossed, then the pixel of interest is marked as a complex pixel in the complex pixel mask. An example of the complex pixel mask is demonstrated in FIG. 1.

Listing 1 demonstrates a portion of one potential functional implementation of the test of depth boundaries process that can be utilized as the input to the complex pixel mask calculation.

Listing 1: Portion of a Function to Test Depth Boundary Changes

```
uint DRTS_DepthBoundaryTestComplex2(float3 PosVS1, float3
PosVS2, float3 PosVS3)
{
  float L1 = length(PosVS2.xyz - PosVS1.xyz);
  float L2 = length(PosVS3.xyz - PosVS2.xyz);
  float DZ1 = abs(PosVS2.z - PosVS1.z) / L1;
  float DZ2 = abs(PosVS3.z - PosVS2.z) / L2;
  float Epsilon = g_DRTS_DepthBoundaryEpsilonMin +
```

-continued

```
    abs(PosVS2.z) * g_DRTS_DepthBoundaryEpsilonPercent;
  uint uBoundary = 0;
  uBoundary = (abs(PosVS1.z - PosVS2.z) > Epsilon) ? (1) :
(uBoundary) ;
  uBoundary = (abs(PosVS2.z - PosVS3.z) > Epsilon) ? (1) :
(uBoundary);
    if (uBoundary)
    {
      uBoundary = (abs (DZ1 - DZ2) >
g_DRTS_DepthBoundaryEpsilonPlanar) ? (1) : (0);
    }
    return uBoundary;
}
``` where PosVS1 and PosVS3 are text pixels;

PosVS2 is the current pixel;

L1 and L2 are the distances between the pixels from the scene perspective;

DZ1 and DZ2 are the rate of change of the depth view space values;

Epsilon is a correction value used to mask changes or differences that are smaller than a specified amount;

g_DRTS_DepthBoundaryEpsilonMin is a specified minimum Epsilon value; g_DRTS_DepthBoundaryEpsilonPercent is a specified Epsilon percentage weighting factor;

g_DRTS_DepthBoundaryEpsilonPlanar is a specified Epsilon depth rate of change minimum for the depth view space (which can avoid pixels that are substantially on a similar plane); and uBoundary is an indicator whether a depth boundary has been crossed or changed between the pixel of interest and at least one of the test pixels.

The Epsilon parameters (the minimum, the percent, and the planar values) can be defaulted to a value within the process, specified by the rendering system, or specified by the calling application, or some combination thereof. The depth boundary test can check the absolute difference in the view space depth (z) values against the specified Epsilon parameters, where the parameters are weighted and so can scale with the view distance. The test can also calculate the rate of change of the z values against a specified Epsilon parameter to determine if the pixels are planar. This can avoid falsely detecting depth boundaries along planes in the distance. This does not require a sampling of the normal buffer data, where the normal buffer stores information relating to which direction the pixel, e.g., surface, is facing.

Applying the complex pixel mask process can utilize as input the packed data buffer that is the output of the preparing the scene process. The output buffer of the complex pixel mask process can be the complex pixel mask buffer containing the complex pixel mask data. The complex pixel mask buffer can be various depth buffer storage formats, such as D16. Copying the complex pixel mask from the packed data buffer to the depth buffer can allow the use of GPU hardware constructs to perform early depth testing, which can be beneficial to avoid instantiating a pixel shader process when so indicated by the resultant of the testing. This process can occur within one iteration and can typically be executed using a full resolution version of the scene.

The complex pixel mask process can execute a depth replacing pixel shader (PS) to set a depth value for all of the pixels indicated in the complex pixel mask. Each pixel can be evaluated separately. For each pixel, the depth value can be set to a first value, such as one, where the pixel has been previously indicated as a complex pixel. The process can set the depth value for the pixel to a second value, such as zero, where the pixel has been previously indicated as a non-complex pixel, e.g., not at a boundary depth change. The output buffer from this process includes the complex pixel mask with the updated depth values. These depth values can be used by later processes to perform early z culling for simple and complex pixels. The z culling can improve the performance of those processes.

Generating the penumbra mask can be executed as one or two passes, such as a horizontal and vertical pass, and can be completed within one iteration. The penumbra mask process can utilize an input buffer including the packed data buffer, and the output buffer can include an updated packed data buffer and a penumbra mask. This penumbra mask process can be executed using any scene resolution, such as full, half, or quarter resolution formats, where the scene resolution is relative to the requested scene resolution from the application, rendering process, or display device.

Figure 2:
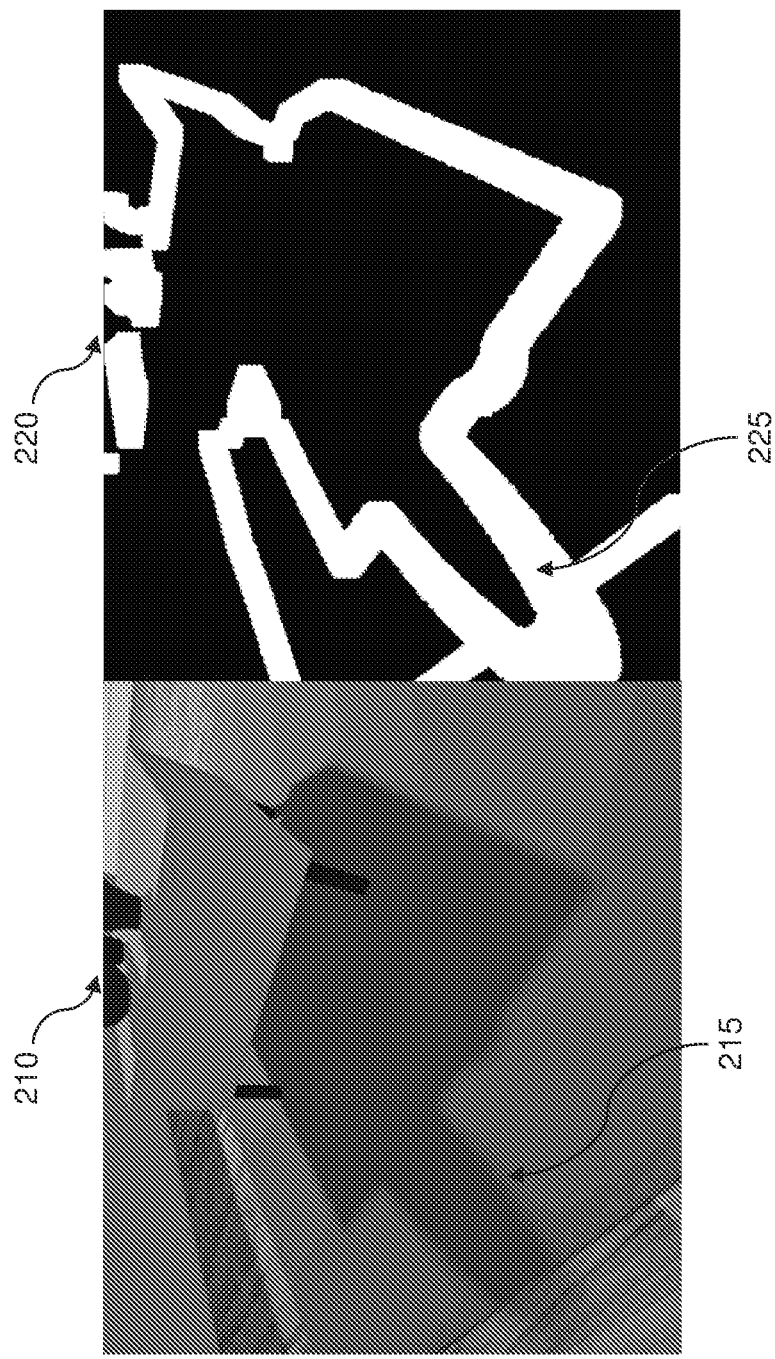
FIG. 2 is an illustration of an image of an example of a penumbra mask employed in a denoising process carried out according to the principles of the disclosure.

The first operation of the penumbra mask process can be to determine if the pixel of interest forms part of a shadow's penumbra region. A pixel can be part of more than one penumbra region, such as if there are overlapping shadows in the scene. If the pixel is part of the penumbra region, then the pixel is sent as an output to a penumbra mask. The penumbra mask can use various storage formats, such as a D16 depth buffer. The penumbra mask can be utilized by later processes, such as with an early z culling process. An example penumbra mask is shown in FIG. 2.

The penumbra mask can be calculated using the values within the visibility channel of the packed-data buffer. The radius and step size used for the calculations can be determined using the example Listing 2.

Listing 2: Example Penumbra Region Radius and Step Size Computation
int Step=(g_DRTS_HalfRes==1.0f)?(1):(2);
int Radius=(g_DRTS_HalfRes==1.0f)?(3*g_DRTS_DenoiseMaxKernelRadius/2):(3*g_DRTS_DenoiseMaxKernelRadius);
where Step is the computed step size utilizing the resolution of the scene;
    g_DRTS_HalfRes is an indicator of the resolution;
    Radius is the computed radius which is scaled to the resolution and a specified radius value; and
    g_DRTS_DenoiseMaxKernalRadius is a value such as from a default value, a system value, or specified by a DLL, API, or calling application. This value can be included in the Epsilon parameters as an Epsilon maximum kernel radius value.

In some aspects, the visibility results can be averaged and tested against an Epsilon penumbra mask value to determine the final penumbra mask. For example, the visibility testing can utilize the code in Listing 3.

Listing 3: Example Visibility Epsilon Penumbra Mask Analyzation
Penumbra=((X>DRTS_PENUMBRA_MASK_EPSILON) &&(X<(1.0f-DRTS_PENUMBRA_MASK_EPSILON)))? (1.0f):(0.0f);
where Penumbra stores the result of the calculation;
    X is one pixel of the penumbra region; and
    DRTS_PENUMBRA_MASK_EPSILON is a specified Epsilon penumbra mask value, such as from a default value, a system value, or specified by a DLL, API, or calling application.

A second operation can be to take the penumbra mask and spread an averaged HitT value to the set of pixels within the penumbra mask that do not already have a HitT value assigned. The average HitT value can be computed by summing the valid HitT values and dividing by the number of valid HitT values. A valid HitT value indicates that the value is the result of a ray intersecting an object. The averaging process is performed for pixels of interest when the associated ray for that pixel did not intersect an object, e.g., the ray tracer recorded the ray as a miss.

A third operation can be to reduce artifacts where an overlap of penumbra occurs, when more than one shadow overlaps an area in the scene. The reducing process can apply a floor, e.g., minimum, value to the HitT value for each pixel in the penumbra region that are within a specified pixel radius. This is done when the pixel of interest has a valid HitT value.

The smoothing HitT data process can use the packed data buffer and the penumbra mask as the input to the input buffer. The output buffer can include an updated packed data buffer. The process can be performed on a scene of any resolution, such as a full, half, or quarter resolution. Typically, the smoothing HitT data process can be executed in one iteration using one or more passes, such as separating the horizontal and vertical passes.

Smoothing HitT data can apply various smoothing techniques, such as a Gaussian smooth of the HitT data stored in the packed data buffer. The selected smoothing technique can utilize a specified radius value, such as a default value, a system value, or a value specified by a DLL, API, or calling application. In some aspects, the smoothing HitT data process can utilize the penumbra mask to take advantage of early z culling to reduce the processing workload.

The denoising process input buffer can include one or more of the packed data buffer, the depth buffer, a normal buffer, and the penumbra mask. The output buffer can include an updated packed data buffer. The denoising process can be performed on an image of various resolutions, such as full, half, or quarter resolution. In some aspects, the denoising process can be executed with more than one iteration, such as two iterations, and it can be performed with one or more passes, such as separating the horizontal and vertical processing.

The denoising process can calculate anisotropic filter directions and world space weights. In some aspects, the denoising process can use early z culling by using the penumbra mask to reduce the processing workload. In some aspects, the denoising process can skip pixels that are included in the complex pixel mask, and can prevent complex pixels from influencing the result of the non-complex pixels, e.g., a change in z depth can be assumed to be non-noise. This aspect can improve existing techniques when down-sampling is used to lower the scene resolution. Existing techniques for down-sampling can yield incorrect world space weights which can be propagated across the anisotropic filter process.

In some aspects, a pixel radius to be used by the anisotropic filter can be estimated. If the estimated radius is less than a specified Epsilon anisotropic filter radius, then the estimated value can be used, e.g., the anisotropic filter radius can be clamped to a maximum of the estimated radius. This can improve the processing performance by reducing the radius of pixels used in the filtering. The Epsilon anisotropic filter radius can be a default value, a system value, or a value specified by a DLL, API, or calling application.

The estimated anisotropic filter radius can be calculated by determining the size of a pixel in world space, such as by analyzing a 3×3 pixel area surrounding the pixel of interest. The radius, i.e., grid size, utilized can be balanced between a larger size which can improve the visual quality and a smaller size that can improve overall performance. In some aspects, the radius can be clamped to 12 pixels as a maximum value. The average distance from the pixel of interest can be computed. Pixels that are included in the complex pixel mask can be excluded from the computations.

An example formula for computing the estimated pixel radius is shown in Listing 4, which can be used to project the size of the light down to the position of the screen pixel, taking into account the occluding distance, e.g., the HitT. This can yield an estimated penumbra size in the world space. This, combined with the size of a pixel in world space, can be utilized to calculate the number of screen pixels of the radius.

Listing 4: Example Formula for Computing an Estimated Filter Pixel Radius

```
if (g_DRTS_SpotLight == 1.0f)
{
PixelRadius = (HitT.xx / length(WorldPos.xyz −
g_Global_LightPos.xyz).xx) * (g_Global_LightSize.xx /
WSPixelSize.xy);
}
else if (g_DRTS_RectangularLight == 1.0f)
{
PixelRadius = (HitT.xx / length(WorldPos.xyz −
g_Global_LightPos.xyz).xx) * (float2(g_DRTS_RectangularLight_Y,
g_DRTS_RectangularLight_X) / WSPixelSize.xy);
}
else
{
   PixelRadius = tan(g_DRTS_DirectionalLightSourceAngle /
180.0f * DRTS_PI).xx * MinDist.xx / WSPixelSize.xy;
}
``` where g_DRTS_SpotLight is a specified type of scene lighting;

PixelRadius is the calculated pixel radius for the filter;

HitT is the packed HitT value calculated in previous passes;

WorldPos is the world space position of the pixel of interest, e.g., the screen pixel being processed;

g_Global_LightPos is the world space position of the light source;

g_Global_LightSize is the size of a light source in the world space;

WSPixelSize is the calculated size of the pixel in the world space;

g_DRTS_RectangularLight is the size of a light source in the world space; and g_DRTS_DirectionalLightSourceAngle is the angle of a light source should the other specified light sources not be present.

In yet another aspect, the denoising process can compute an iterated estimate for the HitT value which can be compared to a sampled HitT value. The comparison can form a basis for computing the final world space weight used. This can also reduce issues in regions where there are overlapping penumbra regions, such as from more than one shadow. The estimate for the HitT value represents how the HitT value can change across each iteration of the anisotropic filter process. The ratio of the estimated HitT value with the sampled HitT value can be used to scale the original world space weight. An example estimation is demonstrated by Listing 5.

Listing 5: Example HitT Value Estimation

```
   float SampleHitT = DRTS_GetHitT(TestMaskValue);
   float IterHitT = CenterHitT + WSPixelSize * float (i);
   float HitTWeight = (IterHitT > SampleHitT) ? saturate(SampleHitT
```

-continued

```
/ IterHitT) : saturate(IterHitT / SampleHitT);
   FilterValue += DRTS_GetVisibility(TestMaskValue) * WSWeight *
HitTWeight;
``` where SampleHitT is the result of the DRTS_GetHitT function;

DRTS_GetHitT is the HitT value stored in the packed data, and processed in previous passes;

IterHitT is the estimated HitT value at a given sample position in the filter (i);

CenterHitT is the HitT value at the pixel of interest;

WSPixel size is the world space pixel size;

HitTWeight is a ratio of the estimated and actual HitT at a given sample position;

saturate is a function that performs a saturation computation, for example, return max(0, min(1, x));

FilterValue is the resulting denoised visibility being accumulated for each sample position of the filter;

DRTS_GetVisibility is the input visibility data; and

WSWeight is the Epsilon anisotropic filter radius world space weight.

These various aspects can be combined in various combinations, such as including all of the aspects in the same denoising process. A denoising process output is demonstrated in FIG. 3.

The process for resolving complex pixels can have an input buffer of at least one of the packed data buffer, the visibility buffer, the depth buffer, the normal buffer, and the complex pixel mask. The output buffer can include the final shadow mask. Typically, this process can be executed using the full resolution version of the scene. The resolving complex pixels process can be completed in one iteration and does not use separate passes.

This resolving complex pixels process uses early z culling to process only those pixels within the complex pixel mask, thereby reducing the processing workload. Two searches are then performed in a pattern that is aware of the depth boundaries, for example, an asterisk shaped pattern. The selected shape is used to increase the opportunity to determine valid pixels that can be used as a filter while avoiding crossing depth boundaries.

The first search analyzes the existing filtered results from the packed data buffer to produce a first boundary result set, which are the denoised visibility data produced by the previous stage of the process. The existing filtered results are averaged. The averaging of the existing filtered results attempts to combine each complex pixel with the denoised results surrounding each respective complex pixel to improve the visual blending.

The second search analyzes the visibility buffer using an Epsilon visibility radius with a filter, such as a Gaussian filter, to produce a second boundary result set. The Epsilon visibility radius can be a default value, a system value, or a value specified by an API, DLL, or calling application. The Epsilon visibility radius should be at a minimum as large as the Epsilon anisotropic filter radius. The second boundary search is filtering the raw full resolution input visibility data. The first boundary result set can then be averaged with the second boundary result set to produce a set of final filtered values which can be written out to the final shadow mask. The averaging of the first and second boundary searches, when applied to the complex pixels, can help to make the complex pixels visually fit the scene. An example of the resolving complex pixels processing is demonstrated in FIG. 4.

Turning now to the figures, FIG. 1 illustrates an example of using a complex pixel mask with an image. FIG. 1 includes an original image 110, with one object highlighted, a pillow 115. FIG. 1 also demonstrates a complex pixel mask 120 of original image 110 with a pillow 125. Complex pixel mask 120 is the output of a complex pixel mask process or generator using original image 110 as input.

The complex pixel mask process analyzes the original image 110, for example, examining the input buffers including the visibility buffer, the HitT buffer, and the depth buffer. The process can determine where there is a significant difference in the depth of neighboring pixels using a depth boundary test, such as shown by the edge of pillow 115 outlined as pillow 125. Smaller depth changes can be ignored, e.g., the depth change falls within a specified Epsilon parameter. The complex pixel mask process can also use the rate of change of the depth of pixels so that larger rates of change are flagged as complex pixels and smaller changes can be safely ignored.

FIG. 2 illustrates an example of using a penumbra mask with an image. FIG. 2 illustrates an original image 210, with one object highlighted, a penumbra 215. FIG. 2 also illustrates a penumbra mask 220 of original image 210 highlighting the penumbra 225. Penumbra mask 220 is the output of a penumbra mask process or generator using original image 210 as input.

The penumbra region is the border between a lighted portion of the scene and the relatively darker shaded umbra portion within the shadow. The penumbra region is a blending of the darker umbra portion and the non-shadow portion of the scene. More complex penumbras can be generated when there is more than one light source or if there are overlapping shadows. The penumbra mask 220 treats the penumbra region as one identifiable area. The pixels that fall within this mask are analyzed separately from other pixels.

Figure 3:
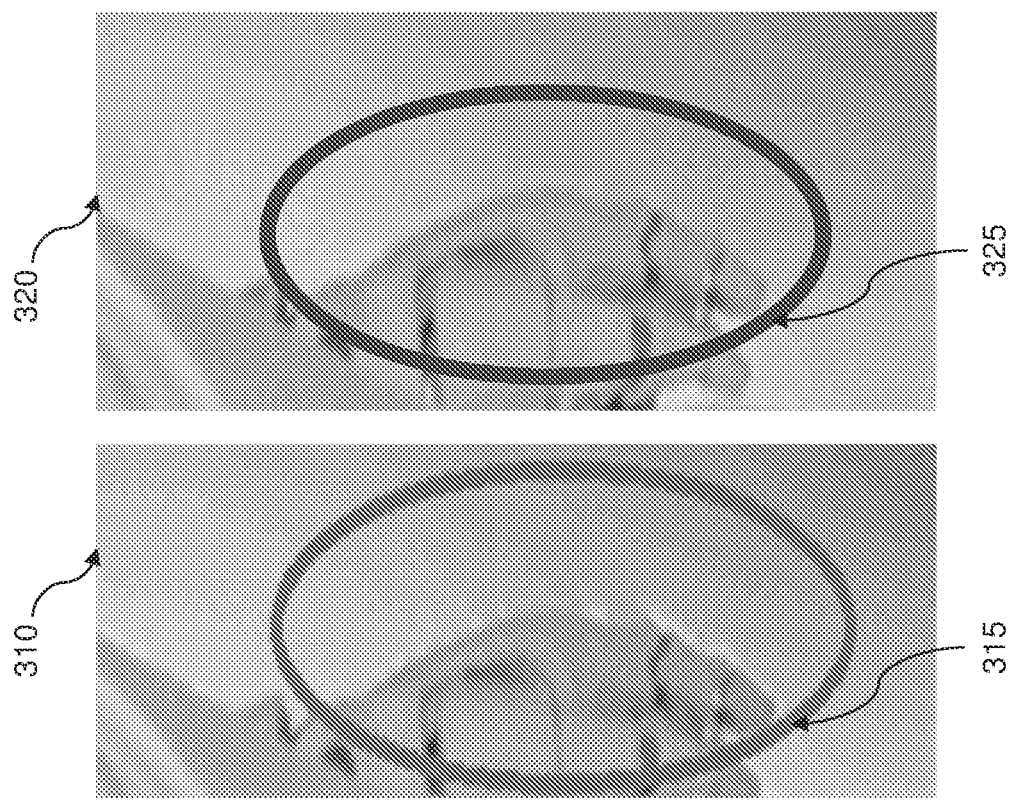
FIG. 3 is an illustration of an image demonstrating an example of a denoising process carried out according to the principles of the disclosure.

FIG. 3 illustrates an example of a denoise process applied to an image. FIG. 3 illustrates an original image 310, with one object highlighted, a hinge 315. FIG. 2 also illustrates a denoised image 320 of original image 310 with the hinge 315 highlighted as hinge 325. The denoising process can analyze the depth boundary areas and penumbra regions to reduce the amount of pixel noise and to blend the neighboring pixels. Hinge 315 shows image noise as a whitish glow around the outside of the hinge 315. Hinge 325 demonstrates that after the denoising process, the whitish glow is significantly reduced.

Figure 4:
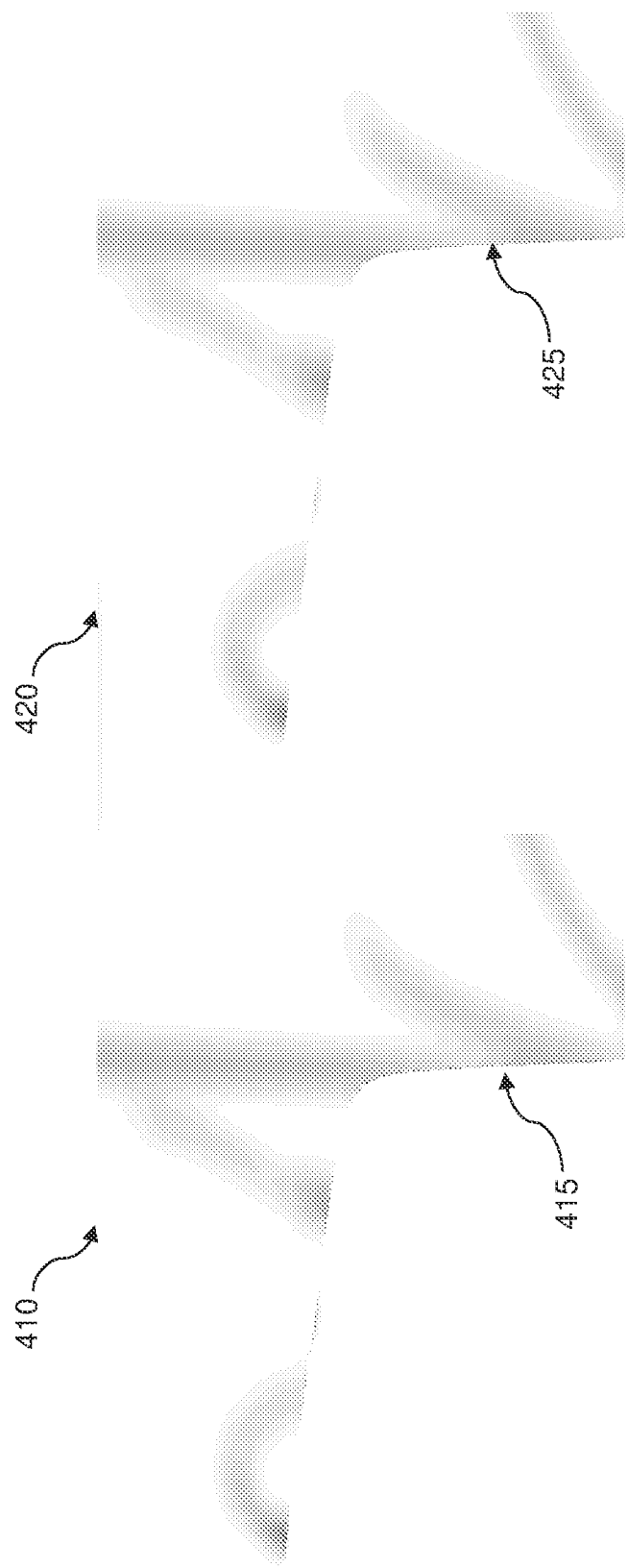
FIG. 4 is an illustration of an image demonstrating an example of a process for resolving complex pixels carried out according to the principles of the disclosure.

FIG. 4 illustrates an example of a process to resolve complex pixels. FIG. 4 illustrates an original image 410, with one object highlighted, a curve portion 415. FIG. 4 also illustrates a complex pixel resolution 420 of original image 410 with a highlighted curve portion 425.

The curved portion 415 demonstrates a speckled black line along the image's edge. After the resolving of the complex pixels, the image's edge demonstrates a smoother grayish line 425. The denoising and complex pixel resolution processing can reduce the pixel noise in the images. The reduction can be of any amount of reduction, including an elimination of the pixel noise. The complex pixel resolution can be the last step of the process (see FIG. 5). The output of the complex pixel resolution process is the final shadow mask to be used by the renderer.

Figure 5:
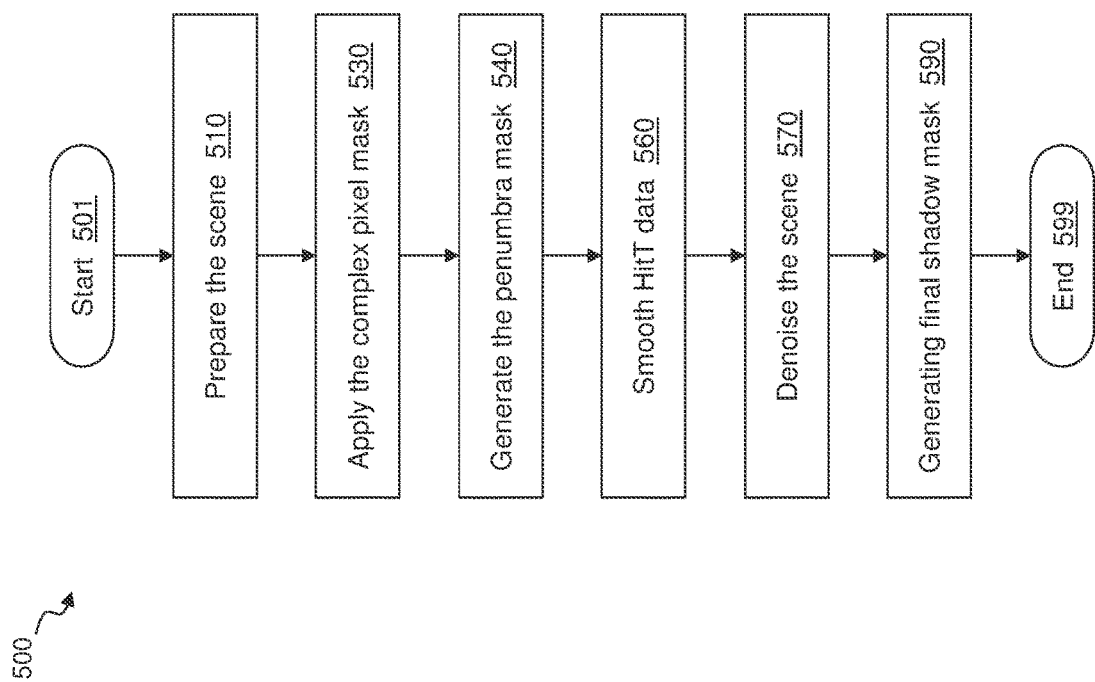
FIG. 5 is an illustration of a flow diagram of an example method for generating a final shadow mask using denoising according to the principles of the disclosure.

FIG. 5 is an illustration of a flow diagram of an example method 500 for generating a final shadow mask using denoising. Method 500 starts at a step 501 and proceeds to a step 510. In the step 510, the image can be prepared using an input buffer that includes at least one of a visibility buffer, a HitT buffer, and a depth buffer. The preparations can include an optional down-sampling of the buffer data to a lower resolution, such as changing a full resolution image to half or quarter resolution. The preparations can also include computing a pixel mask and storing the mask information as one channel of the image in a packed data buffer. The visibility and HitT buffers can be stored as two additional channels of the stored image.

In a step 530, the complex pixel mask can be applied to the scene data stored in the packed data buffer. The output can be a buffer storing the complex pixel mask. This step is typically executed using a full resolution version of the image. It can use a conventional depth replacing PS to set the depth to a first value where a pixel is indicated as complex and to a second value where the pixel is indicated as non-complex.

In a step 540, the penumbra mask can be generated. The penumbra mask generation process can use the packed data buffer as the input buffer and output an updated packed data buffer and the penumbra mask. This step determines if a pixel forms part of a shadow's penumbra region. On a positive result, the pixel is written out to the penumbra mask. This step can also analyze the HitT buffer data to spread an averaged HitT value to neighboring pixels of a pixel of interest within a specified radius of the pixel of interest. This can be done for pixels that do not already have a specified HitT value. This step can also analyze the HitT values with a specified radius of a pixel of interest, and clamp them to a minimum HitT value to reduce issues with overlapping penumbra regions.

In a step 560, the HitT buffer data can be smoothed. This step can utilize a conventional Gaussian smoothing technique, or other smoothing techniques, to increase the blending of neighboring pixels. The smoothing process utilizes an input buffer including the packed data buffer and the penumbra mask. It can output a modified packed data buffer.

In a step 570, the denoising process can be executed. The denoising process can use as the input buffer a least one of the packed data buffer, the depth buffer, the normal buffer, and the penumbra mask. The output can be a buffer including an updated packed data buffer. The denoising process can use early z culling of the penumbra mask to reduce computing processing workload. It can skip the denoising of pixels marked as complex in the complex pixel mask, and can prevent the complex pixel mask from influencing the non-complex pixels. The denoising process can estimate a pixel radius to be used with the anisotropic filter and clamp the pixel radius to a specified maximum to improve computing performance. The process can also compute an iterated estimate of a HitT value which can be compared to a sampled HitT value. The ratio of the estimated HitT value and the sampled HitT value can be used as a ratio to modify the world space weights used in the anisotropic filtering process.

In a step 590, a final shadow mask can be generated by resolving the complex pixels. This process can use as the input buffer at least one of the packed data buffer, the visibility buffer, the depth buffer, the normal buffer, and the complex pixel mask. The output buffer can include the final shadow mask. The complex pixel resolution process uses early z culling so that complex pixels are analyzed and other pixels are ignored. This step includes two boundary searches which can be averaged together to produce a final filtered value. The final filtered value can be written out to the final shadow mask. Method 500 ends a step 599.

Figure 6A:
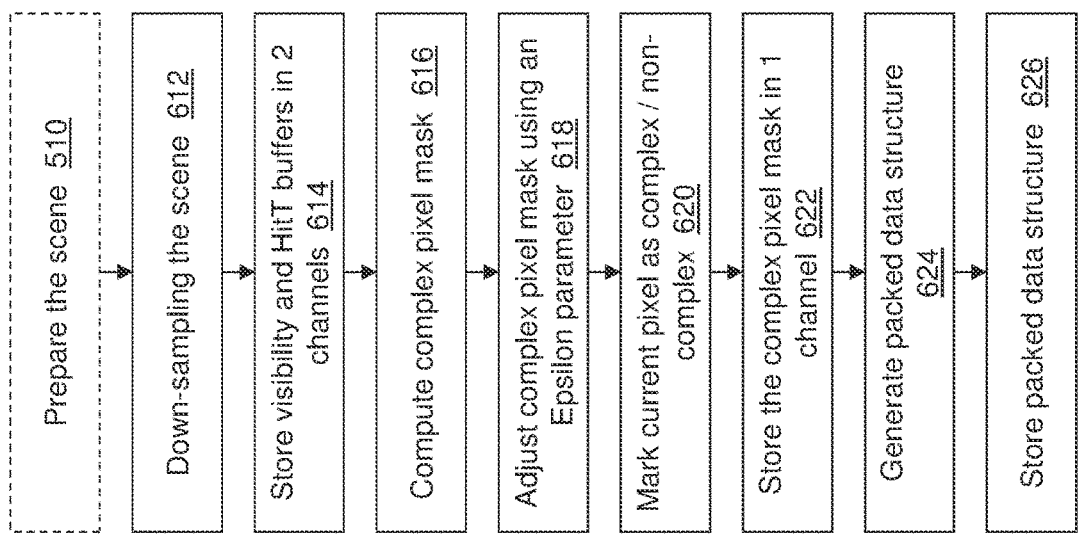
FIG. 6A is an illustration of a flow diagram of an example method, building on the flow diagram of FIG. 5, expanding the process for preparing the scene.

FIG. 6A is an illustration of a flow diagram of an example method 601, building on FIG. 5, expanding the processes for preparing the scene. The method starts with preparing the scene step 510. Proceeding to a step 612, the scene can be analyzed to determine whether it should be down-sampled. A scene can be down-sampled to a half, quarter, or another resolution. In a step 614, the down-sampled scene data, as represented in the visibility and HitT buffers can be stored as two channels of a texture. Storing the buffer data in a texture channel allows for the processing to take advantage of hardware and software capabilities, such as within a GPU.

In a step 616, the complex pixel mask can be computed using the received buffer data. The complex pixel mask can be generated using a grid, e.g., a 5×5 grid. The grid can be used to perform depth boundary testing. In a step 618, the results from the depth boundary testing can be used to adjust the complex pixel mask. During the adjustment process, the depth boundary results can be compared to a specified Epsilon parameter to remove adjustments that do not meet or exceed the Epsilon parameter computation.

In a step 620, the pixels in the complex pixel mask can be marked as complex, meaning there is a depth boundary change, or non-complex, meaning there is no or an insignificant depth boundary change. In a step 622, the updated complex pixel mask can be stored as one channel of the texture, in addition to the two channels used above.

In a step 624, the updated channel textures can be used to generate a packed data structure. In a step 626, the packed data structure can be stored in a packed data buffer and included in the output buffer of the prepare the scene process 510.

Figure 6B:
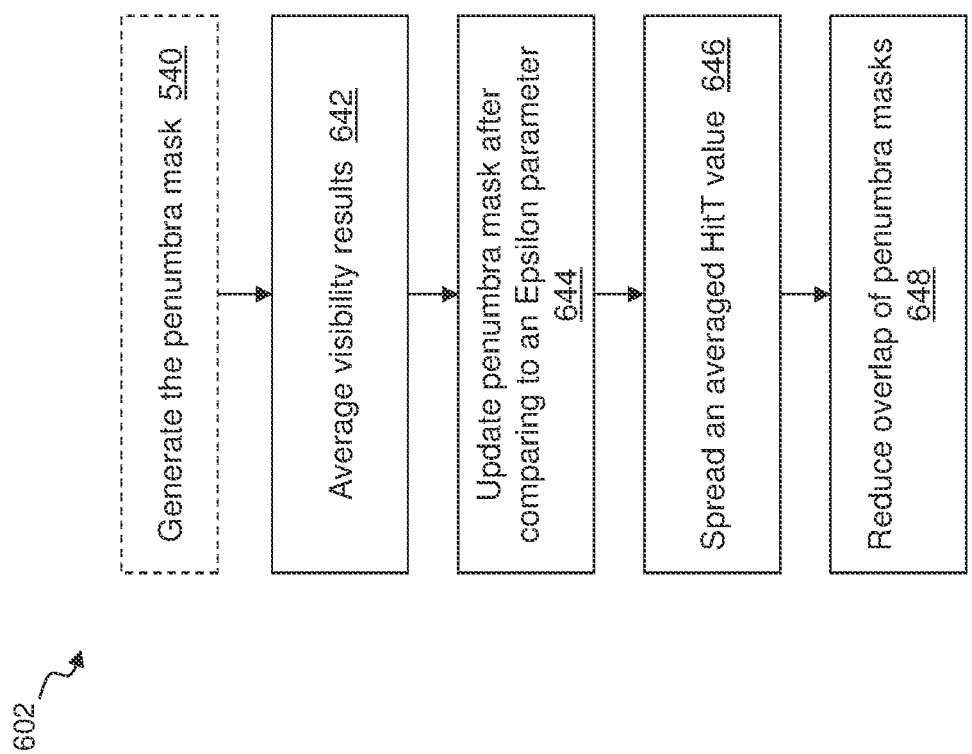
FIG. 6B is an illustration of a flow diagram of an example method, building on the flow diagram of FIG. 5, expanding the process for generating the penumbra mask.

FIG. 6B is an illustration of a flow diagram of an example method 602, building on FIG. 5, expanding the processes for generating the penumbra mask. Method 602 starts at the step 540 to generate the penumbra mask process and proceeds to a step 642. In the step 642, the process can determine the set of pixels that form the penumbra region of a shadow(s). A search can be performed on the visibility channel of the packed data buffer, using a computed radius and step value. This can identify the pixels of interest that should be evaluated for inclusion in the penumbra region. In a step 644, the visibility results can be averaged and then tested against an Epsilon parameter to determine the final result of whether the pixels of interest are part of the penumbra region. The pixels that are within the penumbra region can be written out to the penumbra mask.

In a step 646 an averaged HitT value can be spread to all pixels within the penumbra mask that did not have a HitT value. In a step 648, a minimum HitT value can be spread to a specified radius of the pixel of interest, i.e., clamping the HitT value to at least the minimum specified value. This can reduce issues when penumbras overlap, such as from more than one shadow.

Figure 6C:
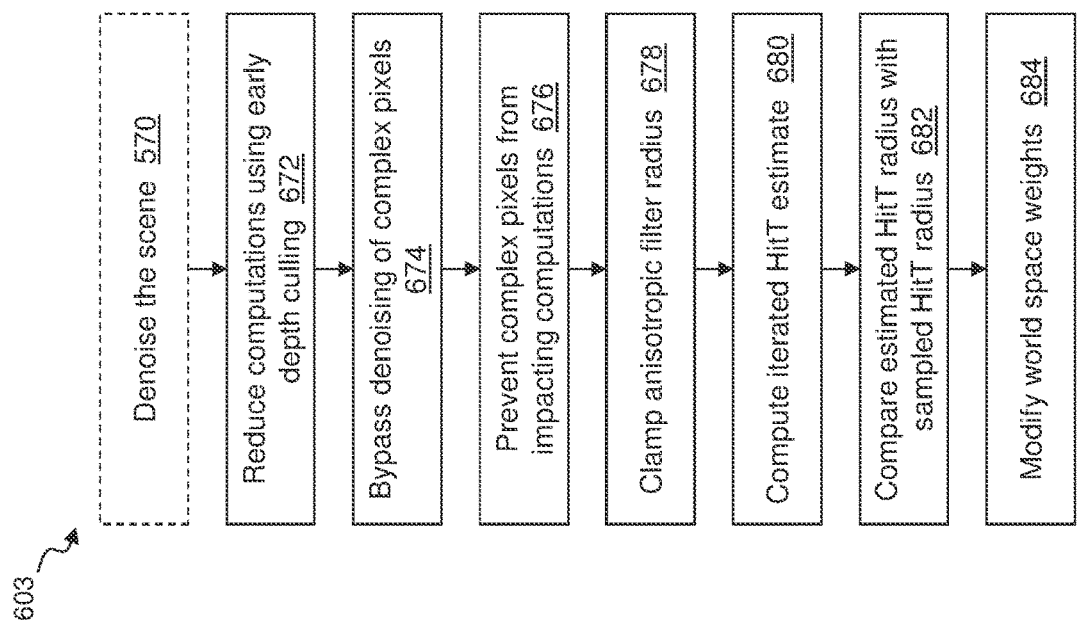
FIG. 6C is an illustration of a flow diagram of an example method, building on the flow diagram of FIG. 5, expanding the process for denoising the scene.

FIG. 6C is an illustration of a flow diagram of an example method 603, building on FIG. 5, expanding the processes for denoising the scene. The method 603 starts at the step 570 for denoising the scene process. Proceeding to a step 672, the process can utilize early z culling to reduce the computations that need to be evaluated. The reduction in computations can improve the overall time it takes to complete the final shadow mask generation.

In a step 674, the process can bypass denoising pixels marked as complex. It can evaluate the non-complex pixels. Evaluating the complex pixels is handled in a future step (see Step 590). Limiting the scope of the evaluations can reduce the overall time to complete the generation of the final shadow mask. In a step 676, the complex pixels can be excluded from neighbor or grid evaluations of non-complex pixels of interest. This can reduce the impact and influence of complex pixels on non-complex pixels.

In a step 678, an anisotropic filter radius can be estimated and then clamped to a maximum value based on an Epsilon parameter using various weighted formulas and algorithms. By limiting the radius used, performance improvements can be realized. In a step 680, an estimate of an iterated HitT value can be computed for a pixel of interest. In a step 682, the estimated HitT value can be compared against a sampled HitT value within the radius of the pixel of interest. In a step 684, the resulting ratio can be used to modify the world space weights within the radius, according to the same proportions. This weighting adjustment can reduce issues with overlapping penumbras.

Figure 6D:
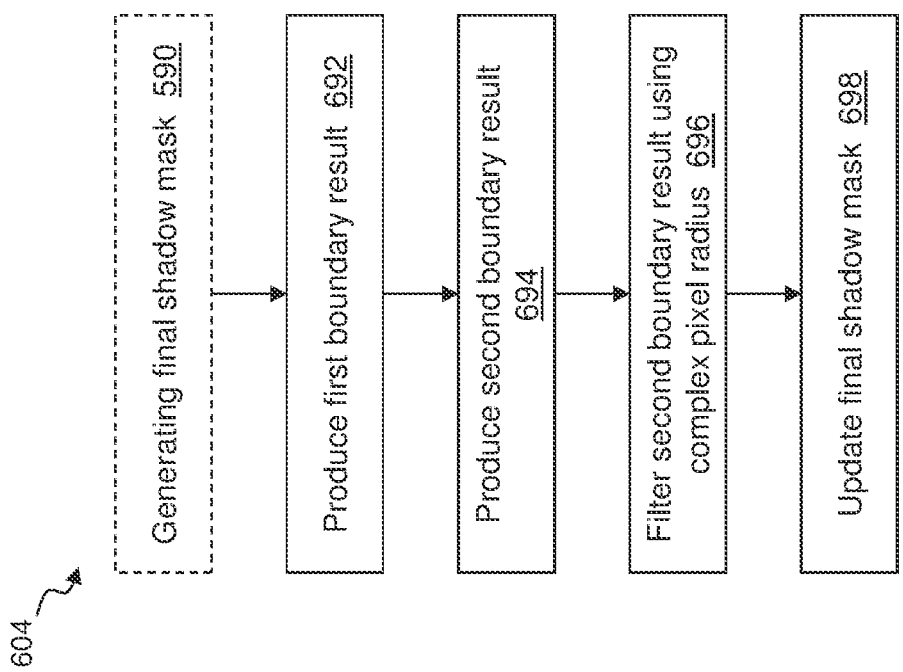
FIG. 6D is an illustration of a flow diagram of an example method, building on the flow diagram of FIG. 5, expanding the process for resolving the complex pixels.

FIG. 6D is an illustration of a flow diagram of an example method 604, building on FIG. 5, expanding the processes for generating the final shadow mask. Method 604 starts at the step 590 to generate the final shadow mask. Proceeding to a step 692, a first boundary search is executed in an asterisk or other pattern within a radius of a pixel of interest. The search is depth boundary aware. The pattern can assist in determining valid pixels to filter with while avoiding the possibility of crossing a depth boundary. The first boundary search looks for existing filtered results from the packed data buffer. The results are averaged together. This technique can help the pixels blend in with their neighboring pixels.

In a step 694, a second boundary search is performed, within a radius of the pixel of interest. This searches for raw visibility results from the buffers. In a step 696, the results of the second boundary search are confined to a specified radius. Typically, the radius is as big as the maximum denoise radius. In a step 698, the first boundary search result and the second boundary search result are averaged together to produce a final filtered value. The final filtered value is written to the final shadow mask for the pixel of interest.

Figure 7:
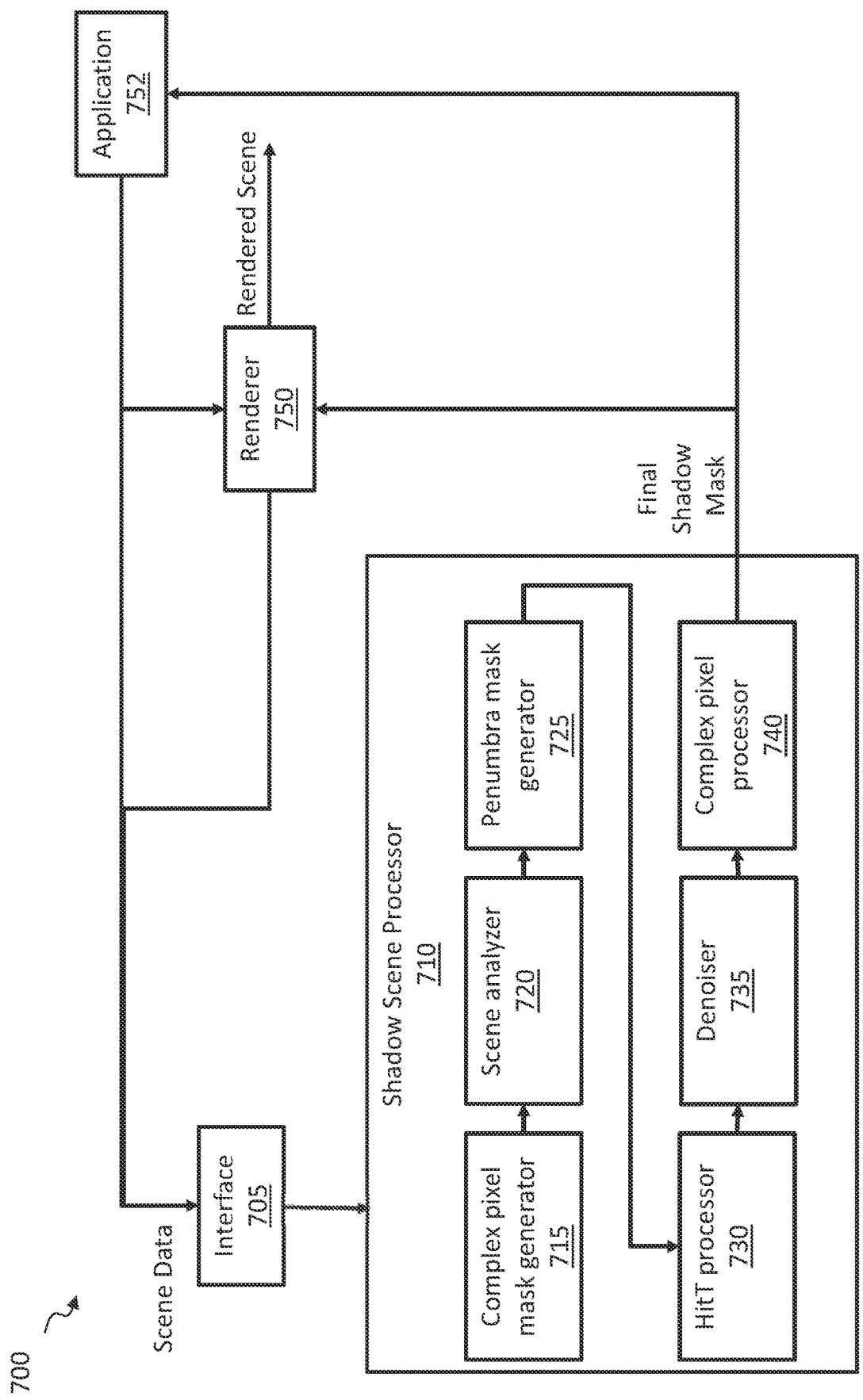
FIG. 7 is an illustration of a block diagram of an example system constructed according to the principles of the disclosure that generates a final shadow mask.

FIG. 7 is an illustration of a block diagram of an example system 700 to generate a final shadow mask. System 700 can receive scene data, process that data for shadow related details, and then output a resultant buffer that includes a final shadow mask. The final shadow mask can be used by a renderer 750 or an application 752 to render the scene. Renderer 750 is a conventional renderer that can produce a frame of the rendered scene and output that frame to a frame buffer, typically to be consumed by a display or monitor. System 700 includes an interface 705 and a shadow scene processor 710. The shadow scene processor 710 includes the following components: a complex pixel mask generator 715, a scene analyzer 720, a penumbra mask generator 725, a HitT processor 730, a denoiser 735, and a complex pixel processor 740. The components of the shadow scene processor 710 can be combined or separated into various combinations of functionality. For example, the complex pixel mask generator and the complex pixel processor can be combined into a single process or function. Other combinations are possible for these components.

The components of the shadow scene processor 710 represent the logical system for performing the functionality described for each component. The components can be implemented using a hardware device, such as a CPU, GPU, or other processor, and can be implemented in application code. The application code can execute on the hardware devices. The functionality can be part of a video driver, a DLL, an API, a separate application, or be embedded as features within a GPU. A video driver, DLL, or API can be instantiated or referenced as appropriate to enable usage of the described functionality. In some aspects, the shadow scene processor 710 can be combined with the renderer 750, such as part of an application code library for a GPU.

Interface 705 can receive scene data in an input buffer. In some aspects, the scene data can be received from the renderer 750 which receives the scene data from application 752, or directly from application 752. The input buffer can include one or more data buffers, such as the visibility buffer, HitT buffer, and depth buffer. Other buffers can be included, such as the normal buffer. In some aspects, the input buffer can include the scene data needed to render the image. In this aspect, the various described buffers can be generated from the scene data by the shadow scene processor 710. The buffers received in the input buffer can be received from an executing application, a render processor, API, DLL, or other system capable of transmitting the input buffer data. The executing application can be executing on the same or different computing system as the shadow scene processor. Interface 705 passes the input buffer and other received information to the shadow scene processor 710.

The input buffer data can be pre-processed by the shadow scene processor 710, such as optionally down-sampling the visibility and HitT buffers. The input buffer data is passed to the complex pixel mask generator 715. The complex pixel mask generator 715 is capable of generating a complex pixel mask. The scene analyzer 720 can store the visibility and HitT buffer data as two channels in a texture map. It can also store the complex pixel mask as third channel of the texture map. The output can be stored in a packed data structure, which can be stored in a packed data buffer.

The penumbra mask generator 725 is capable to determine whether a pixel is part of a shadow's penumbra. The set of pixels so identified form the penumbra region. The HitT processor 730 is capable of spreading an average HitT value to all pixels within the penumbra mask where those pixels do not already have a HitT value. It can also spread a minimum HitT value within a specified radius. The HitT processor 730 can also apply a smoothing algorithm, such as Gaussian smoother to enable a blending of pixel data.

The denoiser 735 is capable of reducing pixel noise within the scene. It can use early z culling to reduce its workload. It can also skip denoising of complex pixels, as indicated in the complex pixel mask. The denoiser 735 can estimate a pixel radius for the anisotropic filter and clamp that value by a specified maximum value. The denoiser 735 can also estimate a HitT value and compare it to a sampled HitT value. The resulting ratio can be applied to world space weights.

The complex pixel processor 740 is capable of resolving the complex pixels, as indicated by the complex pixel mask. This is done by producing two searches. The searches are conducted using an asterisk or other pattern using the pixel of interest as the center of the pattern. The first searches for existing filtered results from the packed data buffer and then average those values together. The second searches for raw visibility results from the input buffer and uses a specified radius from the pixel of interest to filter the results. The resultants from the first and second searches can be averaged together to form the final filtered value that can be stored as part of the final shadow mask for the pixel of interest.

The final shadow mask can be sent back to the calling system, such as the renderer 750, API, DLL, calling application 752, or other system. Typically, the final shadow mask can be used as an input to the renderer 750 to produce a frame of the rendered scene which can be output to a monitor or display device. In some aspects, the renderer 750 can output the rendered scene to another system, such as a storage medium, e.g., a hard disk or memory storage, or a communication medium, e.g., an intranet or internet.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method of processing a ray traced scene, comprising:
   applying a pixel mask to scene data from the scene;
   generating a penumbra mask using the scene data and one or more pixels identified using the pixel mask;
   adjusting hit distance (HitT) values to a set of pixels of the scene data using the penumbra mask; and
   reducing scene noise in the scene data with the adjusted HitT values.

2. The method as recited in claim 1, wherein the one or more pixels are at an edge of a depth boundary change.

3. The method as recited in claim 2, further comprising computing the pixel mask using a pixel grid having a center pixel and marking the center pixel as a complex pixel based on the depth boundary change.

4. The method as recited in claim 1, wherein the set of pixels form a portion of one or more penumbra regions of one or more shadows in the scene.

5. The method as recited in claim 4, wherein the adjusting the HitT values includes reducing an overlap of the one or more penumbra regions by applying a minimum of the HitT values to the set of pixels within a HitT radius of at least one pixel in the set of pixels.

6. The method as recited in claim 1, wherein the applying the pixel mask uses a full resolution image of the scene.

7. The method as recited in claim 1, further comprising generating a final shadow mask using the pixel mask and the scene data with reduced scene noise.

8. The method as recited in claim 7, further comprising receiving the scene data from an application and sending the final shadow mask to the application.

9. A system for processing a scene, comprising:
one or more processing units to perform one or more operations including:
applying a pixel mask to scene data from the scene;
generating a penumbra mask using the scene data and the pixel mask;
adjusting hit distance (HitT) values to a set of the pixels of the scene data that are identified by the penumbra mask; and
reducing scene noise in the scene data using the adjusted HitT values.

10. The system as recited in claim 9, wherein the one or more operations further include generating a final shadow mask using the pixel mask and the scene data with reduced scene noise.

11. The system as recited in claim 10, wherein the one or more operations further include rendering the scene using the final shadow mask and ray tracing.

12. The system as recited in claim 9, where the scene data is from a game application.

13. The system as recited in claim 9, wherein at least one of the one or more processing units is a graphics processing unit (GPU).

14. The system as recited in claim 9, wherein the pixel mask identifies one or more pixels of the scene data at an edge of a depth boundary change.

15. A computer program product having a series of operating instructions stored on a non-transitory computer-readable medium that directs a data processing apparatus when executed thereby to perform operations to process a scene, the operations comprising:
applying a pixel mask to scene data;
generating a penumbra mask using the scene data and one or more pixels at an edge of a depth boundary change identified using the pixel mask;
adjusting hit distance (HitT) values to a set of pixels of the scene data using the penumbra mask; and
reducing scene noise in the scene data with the adjusted HitT values.

16. The computer program product as recited in claim 15, wherein the set of pixels form a portion of one or more penumbra regions of one or more shadows in the scene.

17. The computer program product as recited in claim 16, wherein the adjusting the HitT values includes reducing an overlap of the one or more penumbra regions by applying a minimum of the HitT values to the set of pixels within a HitT radius of at least one pixel in the set of pixels.

18. The computer program product as recited in claim 15, wherein the operations further include generating a final shadow mask using the pixel mask and the scene data with reduced scene noise.

19. The computer program product as recited in claim 18, wherein the operations further include rendering the scene using the final shadow mask and ray tracing.

20. The computer program product as recited in claim 15, where the scene data from the scene is from a game application and the applying the pixel mask uses a full resolution image of the scene.

* * * * *